April 7, 1964 L. TAYLOR ETAL 3,127,665

DELAY LINES

Filed May 16, 1960

Inventors
Lockhart Taylor
Donald F. Walker
By
Cameron, Kerkam & Sutton
Attorneys United States Patent Office 3,127,665

Patented Apr. 7, 1964

3,127,665
DELAY LINES

Lockhart Taylor, Edinburgh, and Donald Ferguson Walker, Barnton, Edinburgh, Scotland, assignors to Ferranti, Limited, Hollinwood, Lancashire, England, a company of Great Britain and Northern Ireland Filed May 16, 1960, Ser. No. 29,389
Claims priority, application Great Britain May 27, 1959
5 Claims. (Cl. 29—155.5)

This invention relates to delay lines.

Previously known delay lines are usually one or other of two kinds known as distributed lines or lumped constant lines. Distributed lines comprise a continuous winding on a suitably conductive former or a continuous bifiler winding in which one conductor is earthed at one end and forms the capacitance of the line, the other conductor forming the inductance of the line. Lumped constant lines comprise a plurality of sections in which the inductance of each section is formed by one or more inductance coils and the capacitance of each section is formed by one or more capacitors.

Both of the above described kinds of delay line suffer from disadvantages. A distributed line, for example, cannot easily be used to provide a range of delay times by the provision of tapping points along its length since the unused portion of the line beyond the tapping point also constitutes a delay line which, if terminated in an open or a short circuit, causes interfering reflected pulses to appear at the tapping point. Terminating the unused portion of the delay line with a matched resistive load avoids these reflections, but the unused portion of the line still shunts the useful load connected to the tapping point and causes a serious mis-match between the used portion of the line and the useful load. A lumped constant line is usually made up from commercially available capacitors and in consequence it may be difficult to build a delay line having desired characteristics.

It is, therefore, an object of the present invention to provide a method of manufacturing a delay line which does not suffer from the above disadvantages.

In accordance with the present invention a method of manufacturing a delay line includes the steps of winding a first section comprising a specified number of turns of a first conductor, winding one or more further sections each comprising a specified number of turns of said first conductor wound bifilarly with a separate conductor and a further specified number of turns of said first conductor only, one end of said separate conductor remaining trapped in the winding, connecting the free end of said first conductor and the free ends of said separate conductors to an electronic oscillator in such manner as to control the frequency of oscillation thereof, connecting one end of a further conductor to the free ends of said separate conductors, winding said first conductor and said further conductor bifilarly until the frequency of oscillation of said oscillator reaches a predetermined frequency, and then winding a further number of turns of said first conductor only to complete a specified number of turns of said first conductor.

As used herein, the expression "wound bifilarly" as applied to two conductors means that the two conductors are wound side by side.

Figure 1A:
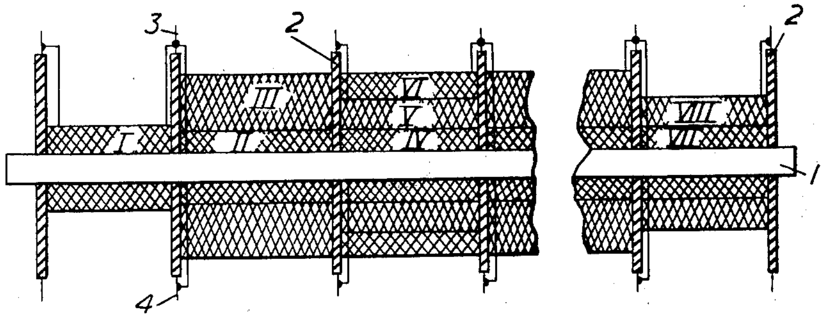
Figure 1B:
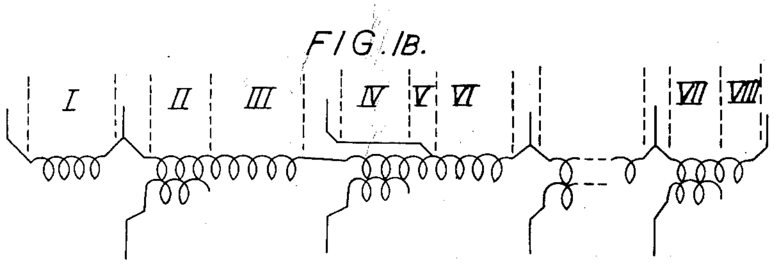
Figure 2:
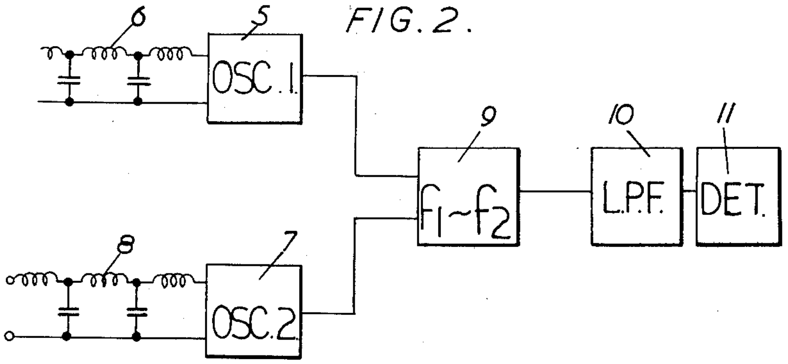

The invention will now be described by way of example with reference to the accompanying drawings in which:

FIGURES 1A and 1B are sectional and schematic representations of a delay line wound in accordance with the invention, and FIGURE 2 is a block diagram of the apparatus utilised in winding a delay line in accordance with the invention.

Referring now to FIGURES 1A and 1B a delay line wound in accordance with the invention is wound on the usual type of former having a central rod 1 and partitions 2 of electrically insulating material dividing the rod 1 into a plurality of sections. Each partition 2 is provided with two separate connecting pins such as 3 and 4.

Each section of the delay line, other than the first and last sections, is wound to have a total inductance L and a total capacitance C, the first section being wound to have a total inductance of $L/2$ and no capacitance and the last section being wound to have a total inductance of $L/2$ and a total capacitance C.

The first section contains a winding I wound from a first conductor and having an inductance $L/2$. The first conductor is then carried over to the second section where it is wound bifilarly with a separate conductor to form a winding II having some inductance and a capacitance C. The first conductor is then continued to form a winding III to bring the total inductance of the section to a value L. The first conductor is then carried over to the third section where it is again wound bifilarly with a separate conductor to form a winding IV having some inductance and a capacitance C. The first conductor is then continued to form a winding V to bring the total inductance of the section so far up to $L/2$ at which point a tapping is made to one of the pins on one of the partitions of the section. The first conductor is then continued to form a winding VI which brings the total inductance of the section up to a value L. Further sections of the winding are wound in a similar manner, tapping points being provided as required. In the last section of the delay line the first conductor is wound bifilarly with a separate conductor to form a winding VII having capacitance C and the first conductor is then continued to form a winding VIII which brings the total inductance of the last section up to a value of $L/2$.

When winding delay lines of the kind described above it has been found that the inductance of the delay line may be reproduced within tolerable limits by specifying the number of turns of the first conductor to be wound in each section. With the capacitance windings, however, the winding of a specified number of turns in each section results in variations of capacitance which are not tolerable, and it is therefore preferable that the delay time of each delay line is checked during the winding of at least one of the intermediate sections and the last section thereof.

In order to make this check the present invention makes use of the apparatus shown in schematic form in FIGURE 2. This apparatus includes a first electronic oscillator 5 the frequency of oscillation of which, $f_1$, is controlled by a delay line 6, which is in the course of being wound, and a second electronic oscillator 7, the frequency of oscillation of which, $f_2$, is controlled by a reference delay line 8. The outputs from the oscillators 5 and 7 are applied to a frequency comparator 9 the output of which, $f_1 \sim f_2$, is applied to a low pass filter 10. A detector device 11 indicates when there is an output from the low pass filter 10.

One method, in accordance with the invention, of manufacturing a delay line having twelve sections is as follows. The winding I (using the notation of FIGURE 1A), which forms the first section, is wound by winding a specified number of turns of a first conductor to provide an inductance of $L/2$. In forming the second section, the winding II is wound by winding bifilarly a specified number of turns of the first conductor and a separate conductor and the winding III is then wound by continuing the first conductor for a further specified number of turns to bring the total inductance of the second section to L, one end of the separate conductor then being trapped in the interlayer between the windings II and III. One end of a further separate conductor of the second section, is then connected to the free end of the separate conductor and the free end of the first conductor and the free end of the separate conductor of the second section are then connected to the first oscillator 5 in such manner as to control the frequency of oscillation thereof, a reference delay line 8 having a suitable delay time controlling the frequency of oscillation of the second oscillator 7. The winding IV of the third section is then wound by winding bifilarly the first conductor and the further separate conductor until there is an output from the low pass filter 10 indicated by the detector 11 when it is known that the delay time of the line as so far wound is within tolerable limits. The winding V is then wound from the first conductor to bring the total number of turns of said first conductor in the third section to the specified number required to produce an inductance of $L/2$, leaving one end of the further separate conductor trapped in the interlayer between windings IV and V, whereupon a tapping is made from the first conductor to one of the pins 3 on a partition 2. The winding VI is then wound from the first conductor by winding a specified number of turns to produce a further inductance of $L/2$ thus bringing the inductance of the third section up to a total value of L. The fourth and fifth sections of the line are then wound by winding specified numbers of turns of each conductor, i.e., the first conductor and a further separate conductor individual to each section, and the sixth section is then wound in a similar manner to the third section after connecting the free end of the first conductor and the free ends of all of the separate conductors to the first oscillator 5 so as to again check the delay time of the line as thus far wound, the reference delay line 8 being a delay line of the appropriate delay time. The seventh, eighth, ninth, tenth and eleventh sections are then wound by winding specified numbers of turns of each conductor. The winding VII of the twelfth section is then wound bifilarly in a similar manner to the winding IV, the reference delay line 8 now being a delay line having a delay time equal to the required delay time of the completed delay line. An output from the low pass filter 10 indicates when the required delay time has been achieved and the winding VIII is then wound to a specified number of turns to bring the total inductance of the last section to $L/2$ and to complete the delay line.

When winding delay lines by the method described above it is sometimes desirable to use during the last stages of the winding a low pass filter having a lower cut-off frequency than that used during the initial stages since during the last stages the frequency of oscillation of the oscillator will be lower than during the initial stages. For example, when winding one delay line the frequency of the output from the oscillator varied from about 500 kc./s. during the initial stages to about 150 kc./s. during the last stages. Therefore, during the initial stages a low pass filter having a cut-off frequency of 10 kc./s. was used thus giving a 2% accuracy. During the last stages, however, this filter would only have given an accuracy of about 7%, and therefore, to restore the 2% accuracy, a low pass filter having a cut-off frequency of 3 kc./s. was used.

The frequency of the second oscillator 7 may be controlled by means other than the reference delay line 8 described above. Furthermore, the frequency of oscillation of the first oscillator 5 may be determined in any suitable manner. It could, for example, be determined by the use of any suitable frequency meter, or by comparing the frequency with the natural frequency of any other frequency-determining device such as a narrow band-pass filter which does not form part of any oscillator.

Delay lines wound in accordance with the invention may be wound to any desired accuracy without the use of commercially available components and due to the fact that the capacitive portions of the delay lines are also inductive the delay lines have good band-pass characteristics i.e. the attenuation of the delay lines is low throughout the pass band and increases rapidly near the cut-off frequencies.

What we claim is:

1. A method of manufacturing a delay line having a first inductive section followed by a plurality of intermediate sections and a last section, each intermediate section and last section having inductance and capacitance, the inductance of each section being formed by a winding of a first insulated conductor and capacitance of each of said intermediate sections and said last section being formed by a winding of a separate insulated conductor wound bifilarly with said first insulated conductor, including the steps of winding a first section comprising a specified number of turns of the first insulated conductor, winding one or more intermediate sections and said last section while the partially completed delay line is connected across the resonant tank circuit of an electronic oscillator in place of the inductance of the resonant tank circuit to control the frequency of oscillation thereof in accordance with the delay time of the partially completed delay line by continuing the winding of said first insulated conductor for a specified number of turns and winding bifilarly therewith for each intermediate section and last section said separate insulated conductors, stopping the bifilar capacitance winding of each intermediate section and last section when said frequency reaches a predetermined value determined according to the number of preceding sections, and completing the inductive winding of each of said intermediate sections and said last section by continuing the winding of said first insulative conductor for a specified number of turns.

2. A method as claimed in claim 1 in which the frequency of oscillation of said oscillator is measured by comparison with the output from a further electronic oscillator having a frequency of oscillation equal to said predetermined value.

3. A method as claimed in claim 2 in which the frequency of oscillation of said further electronic oscillator is controlled by an open ended reference delay line having a delay time equal to the required delay time of the delay line being wound.

4. A method as claimed in claim 2 in which the frequencies of oscillation of said oscillators are compared by applying the output of said oscillators to a frequency comparator, applying the output of said frequency comparator to a low pass filter having a pass band determined by the maximum acceptable difference between said frequencies, and detecting any output from said low pass filter to indicate when said frequencies are within tolerable limits.

5. A method of manufacturing a delay line having a first inductive section followed by a plurality of intermediate sections and a last section each intermediate section and last section having inductance and capacitance, the inductance of each section being formed by a winding of a first insulated conductor and the capacitance of each of said intermediate sections and said last section being formed by a winding of a separate insulated conductor wound bifilarly with said first insulated conductor, including the steps of winding the capacitive windings of at least one selected intermediate section and said last section while the partially completed delay line is connected across the resonant tank circuit of an electronic oscillator in place of the inductance of said resonant tank circuit to control the frequency of oscillation thereof, stopping the bifilar capacitive winding of each of said selected intermediate and last sections when said frequency reaches a predetermined value determined according to the number of preceding sections, and completing the inductive winding of each of said selected intermediate and last sections by winding further specific numbers of turns of said first insulated conductor only, and winding in the inductive winding and capacitive winding of each remaining section with specific numbers of turns of said first conductor and a separate conductor, and winding the inductive winding and the capacitive winding of each remaining section with specific numbers of turns of said first conductor and a separate conductor.

References Cited in the file of this patent

UNITED STATES PATENTS

| | | |
|---|---|---|
| 1,921,869 | Ewald | Aug. 8, 1933 |

| | | |
|---|---|---|
| 2,893,651 | Singleman | July 7, 1959 |
| 2,898,558 | Oberbeck | Aug. 4, 1959 |
| 2,925,960 | Clauss | Feb. 23, 1960 |
| 2,929,132 | Wohlhieter | Mar. 22, 1960 |
| 2,942,333 | Mason | June 28, 1960 |
| 2,943,276 | Lovick | June 28, 1960 |
| 2,946,967 | Elders | July 26, 1960 |

UNITED STATES PATENT OFFICE

CERTIFICATE OF CORRECTION

Patent No. 3,127,665 April 7, 1964

Lockhart Taylor et al.

It is hereby certified that error appears in the above numbered patent requiring correction and that the said Letters Patent should read as corrected below.

Column 4, line 74, beginning with ", and wind-" strike out all to and including "and a separate conductor" in line 5, column 5.

Signed and sealed this 4th day of August 1964.

(SEAL)
Attest:

ERNEST W. SWIDER
Attesting Officer

EDWARD J. BRENNER
Commissioner of Patents